United States Patent
Chaudhary et al.

(10) Patent No.: US 11,299,616 B2
(45) Date of Patent: Apr. 12, 2022

(54) MOISTURE-CURED WIRE AND CABLE CONSTRUCTIONS

(71) Applicant: Dow Global Technologies LLC, Midland, MI (US)

(72) Inventors: Bharat I. Chaudhary, Princeton, NJ (US); Manish Talreja, Lansdale, PA (US); Yichi Zhang, Collegeville, PA (US); Santosh S. Bawiskar, Sugar Land, TX (US); Peter C. Dreux, Lumberton, NJ (US); Manish K. Mundra, Collegeville, PA (US); Abhijit Ghosh-Dastidar, East Brunswick, NJ (US); Rajen M. Patel, Freeport, TX (US); Kalyan Sehanobish, Sanford, MI (US); Chieh Ying Heah, Singapore (SG); Kenneth Hin-Leong Ong, Singapore (SG)

(73) Assignee: Dow Global Technologies LLC, Midland, MI (US)

( * ) Notice: Subject to any disclaimer, the term of this patent is extended or adjusted under 35 U.S.C. 154(b) by 264 days.

(21) Appl. No.: 16/622,273

(22) PCT Filed: Jun. 6, 2018

(86) PCT No.: PCT/US2018/036247
§ 371 (c)(1),
(2) Date: Dec. 12, 2019

(87) PCT Pub. No.: WO2019/005439
PCT Pub. Date: Jan. 3, 2019

(65) Prior Publication Data
US 2020/0207972 A1  Jul. 2, 2020

Related U.S. Application Data

(60) Provisional application No. 62/526,491, filed on Jun. 29, 2017.

(51) Int. Cl.
| | |
|---|---|
| *C08L 51/06* | (2006.01) |
| *C08F 255/02* | (2006.01) |
| *C08K 3/22* | (2006.01) |
| *C08K 5/03* | (2006.01) |
| *C08K 5/14* | (2006.01) |
| *C08K 5/57* | (2006.01) |
| *C08L 23/06* | (2006.01) |
| *C08L 23/08* | (2006.01) |
| *H01B 3/44* | (2006.01) |

(52) U.S. Cl.
CPC ............ *C08L 51/06* (2013.01); *C08K 3/2279* (2013.01); *C08K 5/03* (2013.01); *C08K 5/14* (2013.01); *C08K 5/57* (2013.01); *C08L 23/06* (2013.01); *C08L 23/0815* (2013.01); *H01B 3/441* (2013.01); *C08F 255/02* (2013.01); *C08L 2203/202* (2013.01); *C08L 2207/062* (2013.01); *C08L 2207/064* (2013.01); *C08L 2207/066* (2013.01)

(58) Field of Classification Search
None
See application file for complete search history.

(56) References Cited

U.S. PATENT DOCUMENTS

| | | | |
|---|---|---|---|
| 4,144,202 A | 3/1979 | Ashcraft et al. | |
| 4,255,303 A | 3/1981 | Keogh | |
| 4,574,133 A | 3/1986 | Umpleby | |
| 5,034,442 A | 7/1991 | Hirose et al. | |
| 5,246,783 A | 9/1993 | Spenadel et al. | |
| 5,266,627 A | 11/1993 | Meverden et al. | |
| 5,272,236 A | 12/1993 | Lai et al. | |
| 5,278,272 A | 1/1994 | Lai et al. | |
| 5,430,091 A | 7/1995 | Mahabir | |
| 5,677,383 A | 10/1997 | Chum et al. | |
| 5,852,116 A * | 12/1998 | Cree ...................... C08L 23/04 525/72 |

(Continued)

FOREIGN PATENT DOCUMENTS

| | | |
|---|---|---|
| RU | 2262145 C2 | 10/2005 |
| WO | 2009042387 A1 | 4/2009 |
| WO | 2013116283 | 8/2013 |

OTHER PUBLICATIONS

Office Action from corresponding Russian Patent Application No. 2020 100 898 dated Oct. 19, 2021.

(Continued)

*Primary Examiner* — Richard A Huhn

(57) ABSTRACT

Articles made from a moisture-crosslinkable, polymeric composition comprising in weight percent based on the weight of the composition: (A) 10 to 99.99 wt % of a nonpolar ethylenic polymer grafted with silane functionality (Si-g-npPE), the npPE having the following properties before grafting: (1) a vinyl content of 0.2 to 0.7 per 1,000 carbon atoms, (2) a melt index of 1.5 to 7.0 dg/min, (3) a density of 0.913 to 0.965 g/cc, and (4) a molecular weight distribution (Mw/Mn) of equal to or less than 8; (B) 0.01 to 20 wt % of a silanol condensation catalyst; and (C) 0 to 70 wt % of a flame retardant additive; exhibit one or more of desirable (a) silane grafting efficiency; (b) hot creep performance as a cable jacket/insulation after moisture crosslinking; (c) retained dielectric strength after glancing impact as a moisture crosslinked cable construction; and (d) crush resistance as a moisture crosslinked cable construction.

16 Claims, No Drawings

(56) References Cited

U.S. PATENT DOCUMENTS

| | | |
|---|---|---|
| 5,981,674 A | 11/1999 | Schombourg et al. |
| 5,986,028 A | 11/1999 | Lai et al. |
| 6,048,935 A | 4/2000 | Penfold et al. |
| 6,111,023 A | 8/2000 | Chum et al. |
| 6,331,597 B1 | 12/2001 | Drumright et al. |
| 6,496,629 B2 | 12/2002 | Ma et al. |
| 6,714,707 B2 | 3/2004 | Rossi et al. |
| 6,984,695 B2 | 1/2006 | Brown et al. |
| 7,196,267 B2 | 3/2007 | Sekiguchi et al. |
| 7,355,089 B2 | 4/2008 | Chang et al. |
| 7,504,347 B2 | 3/2009 | Poon et al. |
| 7,514,489 B2 | 4/2009 | Granada, Jr. et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 8,912,297 B2 | 12/2014 | Flory et al. |
| 9,034,967 B2 | 5/2015 | Bolourchi et al. |
| 2002/0197471 A1 | 12/2002 | Barnes et al. |
| 2008/0251273 A1 | 10/2008 | Brown et al. |
| 2009/0301751 A1 | 12/2009 | Iwasaki et al. |
| 2010/0209705 A1* | 8/2010 | Lin .................. C08L 51/06 428/391 |

OTHER PUBLICATIONS

Morshedian, Jalil, et. al., "Polyethylene Cross-linking by Two-step Silane Method: A Review," Iranian Polymer Journal, 2009, p. 103-128, vol. 18, No. 2.

Williams, T., et. al., "The Construction of a Polyethylene Calibration Curve for Gel Permeation Chromatography Using Polystyrene Fractions," Polymer Letters, 1968, p. 621-624, vol. 6.

Yussuf, A. A., et al., "Silane Grafting and Crosslinking of Metallocene-catalysed LLDPE and LDPE," Malaysian Polymer Journal, 2007, p. 58-71, vol. 2, No. 2.

* cited by examiner

MOISTURE-CURED WIRE AND CABLE CONSTRUCTIONS

FIELD OF THE INVENTION

This invention relates to wire and cable constructions, particularly to wire and cable insulation sheaths and protective jackets.

BACKGROUND OF THE INVENTION

Ethylene silane copolymers (in combination with appropriate silanol condensation catalysts) are widely employed to make the insulation/jacket layers of low voltage cable constructions (by extrusion processes). These copolymers can be made either by copolymerization of ethylene with suitable alkoxysilanes in a reactor (to make "reactor ethylene silane copolymers," such as SI-LINK™ AC DFDB-5451 NT), or by post-reactor grafting of alkoxysilanes to ethylenic polymers. Those ethylene silane copolymers made by the latter approach are referred to as "silane grafted ethylenic polymers," and can be classified as one of the following two types:

1. SIOPLAS™ process (made in a separate step prior to use in the cable extrusion process); or
2. MONOSIL™ process (made in situ during the cable manufacturing process—by one step melt blending, reaction and extrusion of ethylenic polymer compositions containing peroxide, silane and catalyst).

After extrusion, the cables are conditioned at humid conditions in order to effect crosslinking of the polymer layers (to yield adequately low hot creep values, measured at 150° C. or 200° C.). The entire cable construction needs to demonstrate sufficiently high abuse-resistance properties (in particular, crush resistance and retained dielectric strength after glancing impact). These performance requirements can be particularly challenging to meet when the compositions contain fillers, such as high loadings of flame-retardant additives.

SUMMARY OF THE INVENTION

In one embodiment, the invention is a moisture-crosslinkable, polymeric composition comprising in weight percent (wt %) based on the weight of the composition:
(A) 10 to 99.99 wt % of a nonpolar ethylenic polymer (npPE) grafted with silane functionality (Si-g-npPE), the npPE having the following properties before grafting:
(1) a vinyl content of 0.2 to 0.7 per 1,000 carbon atoms,
(2) a melt index (MI or $I_2$) of 1.5 to 7.0 decigrams per minute (dg/min),
(3) a density of 0.913 to 0.965 grams per cubic centimeter (g/cc), and
(4) a molecular weight distribution (MWD or Mw/Mn) of equal to or less than ($\leq$)8;
(B) 0.01 to 20 wt % of a silanol condensation catalyst; and
(C) 0 to 70 wt % of a flame retardant additive.
In one embodiment, the nonpolar ethylenic polymer is made by a catalyzed process, i.e., a process that employs a catalyst, as opposed to an uncatalyzed process, e.g., low density polyethylene (LDPE) made by a high pressure process. In one embodiment, the moisture-crosslinkable, polymeric composition is thermoplastic. In one embodiment, the moisture-crosslinkable, polymeric composition further comprises a flame retardant additive. In one embodiment, the flame retardant additive is an organic flame retardant. In one embodiment the flame retardant additive is an inorganic flame retardant. In one embodiment the flame retardant additive is nonhalogenated or halogen-free.

In one embodiment, the invention is a moisture-crosslinkable, polymeric composition comprising in weight percent based on the weight of the composition:
(A) 4.00 to 99.67 wt % of a nonpolar ethylenic polymer (npPE) having:
(1) a vinyl content of 0.2 to 0.7 per 1,000 carbon atoms,
(2) an $I_2$ of 1.5 to 7.0 dg/min,
(3) a density of 0.913 to 0.965 g/cc, and
(4) MWD of equal to or less than ($\leq$)8;
(B) 0.3 to 5 wt % of a graftable silane-containing compound, e.g., an alkoxysilane;
(C) 0.01 to 20 wt % of a silanol condensation catalyst;
(D) 0.02 to 1.0 wt % peroxide initiator; and
(E) 0 to 70 wt % of a flame retardant additive.
In one embodiment, the nonpolar ethylenic polymer is made by a catalyzed process as opposed to an uncatalyzed process, e.g., LDPE made by a high pressure process. In one embodiment, the moisture-crosslinkable, polymeric composition is thermoplastic. In one embodiment, the moisture-crosslinkable, polymeric composition further comprises a flame retardant additive. In one embodiment, the flame retardant additive is an organic flame retardant. In one embodiment, the flame retardant additive is an inorganic flame retardant. In one embodiment, the flame retardant additive is nonhalogenated or halogen-free.

In one embodiment, the invention is a wire or cable comprising a coating made from a composition of one of the embodiments described above. In one embodiment, the coating is an insulation sheath and/or a protective outer jacket. In one embodiment, the wire or cable comprising a coating made from one of the compositions of the embodiments described above exhibits a retained alternating current breakdown (ACBD) after glancing impact of greater than or equal to ($\geq$)2%, or $\geq$5%, or $\geq$10%, or $\geq$15%, or $\geq$20%, or $\geq$25%, or $\geq$30%, or $\geq$35%, or $\geq$40%, or $\geq$45%, or $\geq$50%, or $\geq$55%.

The compositions of this invention exhibit surprising improvements in one or more of the following properties: (a) silane grafting efficiency; (b) hot creep performance of cable jacket/insulation after moisture crosslinking; (c) retained dielectric strength after glancing impact of moisture crosslinked cable construction; and (d) crush resistance of moisture crosslinked cable construction.

DETAILED DESCRIPTION OF THE INVENTION

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Composition" and like terms mean a mixture of materials which comprise the composition, as well as reaction products and decomposition products formed from the materials of the composition.

"Polymer" and like terms mean a macromolecular compound prepared by reacting (i.e., polymerizing) monomers of the same or different type. "Polymer" includes homopolymers and interpolymers. Trace amounts of impurities, for example, catalyst residues, may be incorporated into and/or within the polymer. The term also embraces all forms of copolymer, e.g., random, block, etc. Although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers are referred to has being based on "units" that are the polymerized form of a corresponding monomer.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Ethylenic polymer", "ethylene-based polymer," "ethylene polymer," "polyethylene" and like terms mean a polymer that contains equal to or greater than 50 weight percent (wt %), or a majority amount, of polymerized ethylene based on the weight of the polymer, and, optionally, may comprise one or more comonomers. The generic term "ethylene-based polymer" thus includes ethylene homopolymer and ethylene interpolymer. These terms do not include an ethylenic polymer with polar functionality other than a silane group. A suitable comonomer is an alpha-olefin. "Ethylene-based polymer" and the term "polyethylene" are used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE).

An "ethylene/α-olefin polymer" is an polymer that contains a majority amount of polymerized ethylene, based on the weight of the polymer, and one or more α-olefin comonomers.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ HDPE Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad molecular weight distribution (MWD). LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

A "medium density polyethylene" (or "MDPE") is an ethylene homopolymer or an ethylene/α-olefin copolymer with at least one $C_4$-$C_{10}$ α-olefin comonomer, or $C_4$-$C_8$ α-olefin comonomer and a density from 0.926 g/cc, or 0.930 g/cc to 0.935 g/cc, or 0.940 g/cc. The MDPE can be a monomodal copolymer or a multimodal copolymer. A nonlimiting example of MDPE includes RESILITY™ XDPDB-3162, available from The Dow Chemical Company.

"Multi-component ethylene-based copolymer" (or "EPE") comprises units derived from ethylene and units derived from at least one $C_3$-$C_{10}$ α-olefin comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

"Polar," "polar polymer", and like terms refer to polymer molecules with a permanent dipole, i.e., the polymer molecule has a positive end and a negative end. In other words, the electrons in a polar molecule are not shared equally among the atoms of the molecule. In contrast, "nonpolar," "nonpolar polymer" and like terms refer to polymer molecules that do not have a permanent dipole, i.e., the polymer does not have a positive end and a negative end. The electrons in a nonpolar molecule are essentially equally shared among the atoms of the molecule. Most hydrocarbon liquids and polymers are nonpolar.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ULDPE resins (The Dow Chemical Company) and FLEXOMER™ VLDPE resins (The Dow Chemical Company).

A "conductor" is an element of elongated shape (wire, cable, optical fiber) for transferring energy at any voltage (DC, AC, or transient). The conductor is typically at least one metal wire or at least one metal cable (such as aluminum or copper), but may be optical fiber. The conductor may be a single cable or a plurality of cables bound together (i.e., a cable core, or a core).

A "sheath" is a generic term and when used in relation to cables, it includes insulation coverings or layers, protective jackets and the like.

A "wire" is a single strand of conductive metal, e.g., copper or aluminum, or a single strand of optical fiber.

A "cable" is at least one conductor, e.g., wire, optical fiber, etc., within a protective jacket or sheath. Typically, a cable is two or more wires or two or more optical fibers bound together in a common protective jacket or sheath. Combination cables may contain both electrical wires and optical fibers. The individual wires or fibers inside the jacket or sheath may be bare, covered or insulated. Typical cable designs are illustrated in U.S. Pat. Nos. 5,246,783; 6,496,629; and 6,714,707.

"Crosslinkable," "curable" and like terms indicate that the polymer, before or after shaped into an article, is not cured or crosslinked and has not been subjected or exposed to treatment that has induced substantial crosslinking although the polymer comprises additive(s) or functionality which will cause, promote or enable substantial crosslinking upon subjection or exposure to such treatment (e.g., exposure to water).

"Moisture-crosslinkable polymeric composition" and like terms mean a composition that comprises a polymer that can be crosslinked upon exposure to humidity or water at appropriate temperature. Preferably, one of the polymers in the composition has hydrolysable silane groups.

"Hydrolysable silane group" and like terms mean a silane group that will react with water. These include alkoxysilane groups on monomers or polymers that can hydrolyze to yield silanol groups, which in turn can condense to crosslink the monomers or polymers.

A "halogen" is an element in IUPAC Group 17 of the Periodic Table of Elements, which includes fluorine (F), chlorine (Cl), bromine (Br), iodine (I), and astatine (At).

"Halogen-free" and like terms mean that the flame retardant is without or substantially without halogen content, i.e., contain less than 2000 mg/kg of halogen as measured by ion chromatography (IC) or a similar analytical method. Halogen content of less than this amount is considered inconsequential to the efficacy of the flame retardant in, for example, a wire or cable covering.

"Room temperature" and like terms mean 23° C.

Ethylenic Polymer Having Hydrolysable Silane Groups

In one embodiment, the composition of this invention comprises a silane-grafted ethylenic polymer. The composition of this invention does not comprise an ethylenic polymer made from the copolymerization of ethylene and a silane-containing compound in a reactor, e.g., vinyl trimethoxy silane.

Ethylenic Polymer

The nonpolar ethylenic polymers used in the practice of this invention can be branched, linear, or substantially linear, and can be made by any polymerization or copolymerization process, e.g., solution, gas phase, slurry, high pressure, etc. Representative of branched ethylenic polymers is LDPE which is typically made by a high pressure, gas phase process and is characterized by extensive long chain branching. As used herein, the term "high-pressure reactor" or "high-pressure process" is any reactor or process operated at a pressure of at least 5,000 pounds per square inch (psi) (34.47 megaPascal or MPa).

Representative of linear ethylenic polymers is linear low density polyethylene (LLDPE) which is typically made in a low pressure process and is characterized by an absence of long chain branching. The process is typically gas or solution phase depending upon the monomer that is copolymerized with ethylene, e.g., butene and hexene are typically (but not the only monomers) copolymerized with ethylene in a gas phase process while octene is typically (but not the only monomer) copolymerized with ethylene in a solution phase process.

Representative of substantially linear ethylenic polymers is substantially linear polyethylene (SLEP) which is typically made in a solution process and is characterized in part by having a backbone that is substituted with 0.01 to 3 long-chain branches per 1,000 carbon atoms. In some embodiments, the ethylenic polymer can have a backbone that is substituted with 0.01 to 1 long-chain branches per 1,000 carbon atoms, or from 0.05 to 1 long-chain branches per 1,000 carbon atoms.

The ethylenic polymers used in the practice of this invention are made using olefin polymerization catalysts that include Ziegler-Natta catalysts, chrome catalysts, and molecular catalysts. Ziegler-Natta (Z-N) catalysts such as $TiCl_4/MgCl_2$ and chrome catalysts such as a chromium oxide/silica gel are heterogeneous in that their catalytic sites are not derived from a single molecular species. Heterogeneous catalysts produce polyolefins with broad molecular weight distributions (MWD) and broad chemical composition distributions (CCD). A molecular catalyst is homogeneous in that it theoretically has a single catalytic site that is derived from a ligand-metal complex molecule with defined ligands and structure. As a result, molecular catalysts produce polyolefins with narrow CCD and narrow MWD, approaching but in practice not reaching the theoretical limit of Mw/Mn=2. Metallocenes are molecular catalysts that contain unsubstituted cyclopentadienyl ligands (Cp). Post-metallocene are derivatives of metallocenes that contain one or more substituted CP ligands, such as constrained geometry catalysts, or are non-sandwich complexes. Examples of post-metallocene catalysts are bis-phenylphenoxy catalysts, constrained geometry catalysts, imino-amido type catalysts, pyridyl-amide catalysts, imino-enamido catalysts, aminotroponiminato catalysts, amidoquinoline catalysts, bis(phenoxy-imine) catalysts, and phosphinimide catalysts.

In one embodiment of the invention, the ethylenic polymer that is grafted with a silane compound is made in a solution process using a Ziegler-Natta, metallocene and/or constrained geometry catalyst. In one embodiment, the nonpolar ethylenic polymers are ethylene-octene copolymers made by a solution process. Ethylenic polymers made by a gas phase or slurry process that is catalyzed by chromium oxide, or by a non-catalyzed high pressure gas phase process, are disfavored.

The ethylenic polymers used in the practice of this invention include both homopolymers and interpolymers, and if an interpolymer, then both random and blocky interpolymers. Since the ethylenic polymers used in the practice of this invention are nonpolar (np) before grafting with a silane compound, polar-functionalized polymers such as ethylene vinyl acetate, ethylene ethyl acrylate, etc. are not used in the practice of this invention. The ethylene polymer comprises at least 50, preferably at least 60 and more preferably at least 80, wt % of units derived from ethylene. The other units of the ethylenic polymer, if an interpolymer, are typically derived from one or more polymerizable monomers including (but not limited to) α-olefins.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative ethylenic interpolymers include copolymers of ethylene/propylene, ethylene/butene, ethylene/1-hexene, ethylene/1-octene, ethylene/styrene, and the like. Illustrative ethylenic terpolymers include ethylene/propylene/1-octene, ethylene/propylene/butene, ethylene/butene/1-octene, ethylene/propylene/diene monomer (EPDM) and ethylene/butene/styrene.

Examples of ethylenic polymers useful in the practice of this invention include HDPE; MDPE; LLDPE; LDPE; homogeneously branched, linear ethylene/α-olefin copolymers (e.g. TAFMER™ by Mitsui Petrochemicals Company Limited and EXACT™ by DEX-Plastomers); homogeneously branched, substantially linear ethylene/α-olefin polymers (e.g., AFFINITY™ polyolefin plastomers and elastomers available from The Dow Chemical Company); ethylene block copolymers (e.g., INFUSE™ also available from The Dow Chemical Company), and combinations thereof. The substantially linear ethylene copolymers are more fully described in U.S. Pat. Nos. 5,272,236, 5,278,272 and 5,986,028, and the ethylene block copolymers are more fully described in U.S. Pat. Nos. 7,579,408, 7,355,089 7,524,911, 7,514,517, 7,582,716 and 7,504,347.

Ethylenic interpolymers of particular interest for use in the practice of this invention are LLDPE, HDPE, ethylene plastomers/elastomers, and combinations thereof. These ethylenic copolymers are commercially available from a number of different sources including The Dow Chemical Company under such trademarks as DOWLEX™, ATTANE™, FLEXOMER™, and AFFINITY™. One preferred polymer is LLDPE.

The amount of ethylenic polymer present in the compositions of this invention can vary widely, but the amount is typically 10 to 99.99, or 20 to 99.5, more typically 30 to 99.3 and even more typically 35 to 99.0, wt % based on the total weight of the composition. The ethylene polymer can be present as a single polymer, e.g., LLDPE, or as a blend of two or more polymers, e.g., LLDPE and HDPE, or LLDPE and an ethylene elastomer/plastomer.

The ethylenic polymers have a density before grafting in the range of from 0.870 to 0.965, or from 0.890 to 0.965, or from 0.890 to 0.920, or from 0.913 to 0.965, or from 0.915 to 0.945, or from 0.917 to 0.930, or from 0.916 to 0.920, g/cc as measured by ASTM D-792. In an embodiment, at least one ethylenic polymer has a density before grafting in the range of from 0.913 to 0.965, or from 0.915 to 0.945, or from 0.917 to 0.930, or from 0.916 to 0.920, g/cc.

The ethylenic polymers have a melt index ($I_2$) before grafting in the range of 1.5 to 7.0 decigrams per minute (dg/min), or 1.5 to 6.0 dg/min, or 1.5 to 5.0 dg/min, or 2.0 to 6.0 dg/min. $I_2$ is determined under ASTM D-1238, Condition E and measured at 190° C. and 2.16 kg.

The ethylenic polymers have a vinyl content before grafting of vinyls per 1,000 carbon atoms of equal to or greater than ($\geq$)0.20, or $\geq$0.22, or $\geq$0.24 and equal to or less than ($\leq$)0.70, or $\leq$1.65, or $\leq$1.60. In one embodiment, the ethylenic polymers have a vinyl content before grafting of vinyls per 1,000 carbon atoms of from 0.20 to 0.60, or from 0.22 to 0.59, or from 0.25 to 0.58, or from 0.26 to 0.57. Vinyl content is calculated or measured as described in the Test Methods of the Examples.

The ethylenic polymers have a molecular weight distribution (MWD or Mw/Mn) before grafting of equal to or less than ($\leq$)8.0, or $\leq$7.5, or $\leq$7.0, or $\leq$6.5, or $\leq$6.0, or $\leq$5.5, or $\leq$5.0, or 4.5, or 4.0, or 3.5. In one embodiment, the ethylenic polymers have a Mw/Mn before grafting of from 0.1 to 8.0, or from 0.5 to 7.0, or from 1.0 to 6.5, or from 2.3 to 6.4. MWD is calculated or measured as described in the Test Methods of the Examples.

In one embodiment, the crystallinity at room temperature of the ethylenic polymer before grafting ranges from 25% to 80%, or from 27% to 80%, or from 40% to 80%, or from 42% to 70%, or from 44% to 55%, or from 45% to 50%. In one embodiment the crystallinity at room temperature ranges from 40% to 70%, or 60%, or 55%, or 54%, or 53%, or 52%, or 51%, or 50%, or 49%, or 48%, or 47%, or 46%, or 45%, or 44%, or 43%, or 42%, or 41%. In one embodiment the crystallinity at room temperature ranges from 55% to 40%, or 41%, or 42%, or 43%, or 44%, or 45%, or 46%, or 47%, or 48%, or 49%, or 50%, or 51%, or 52%, or 53%, or 54%. In one embodiment the crystallinity at room temperature ranges from 45% to 54%, or 46% to 53%, or 47% to 52%, or 48% to 51%, or 49% to 50%. Crystallinity is measured/calculated as described in the Examples.

In one embodiment, the ethylenic polymer before grafting is of any crystallinity at room temperature. In one embodiment, the crystallinity at room temperature of the ethylenic polymer before grafting ranges from equal to or greater than (≥)0% to equal to or less than (≤)80%. In an embodiment, at least one ethylenic polymer before grafting has a crystallinity at room temperature before grafting of from 40% to 80%, or from 42% to 70%, or from 44% to 55%, or from 45% to 50%.

In one embodiment, the ethylenic interpolymer is a blend of the ethylene plastomer/elastomer and LLDPE. In one embodiment, the ethylene plastomer/elastomer is an ethylene/butene copolymer. The ethylene/butene copolymer has one, some, or all, of the following properties before grafting: (i) a density from 0.880 g/cc, or 0.885 g/cc, or 0.890 g/cc to 0.892 g/cc, or 0.895 g/cc, or 0.900 g/cc; and/or (ii) a melt index ($I_2$) from 1 dg/min, or 2 dg/min, or 3 dg/min, or 4 dg/min to 5 dg/min, or 6 dg/min, or 10 dg/min; and/or (iii) a crystallinity at room temperature from 25%, or 26%, or 27% to 28%, or 29%, or 30%, or 35%.

Silane Functionality

Any silane (or silane-containing compound) that will effectively graft to a nonpolar ethylenic polymer, and thus enable crosslinking of the ethylenic polymer, can be used in the practice of this invention, and those described by the following formula are exemplary

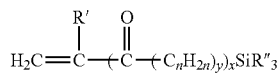

in which R' is a hydrogen atom or methyl group; x and y are 0 or 1 with the proviso that when x is 1, y is 1; n is an integer from 1 to 12 inclusive, preferably 1 to 4, and each R'' independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R'' groups is an alkyl. Such silanes can be grafted to a suitable nonpolar ethylenic polymer, such as those described above, by the use of a suitable quantity of organic peroxide, either before or during a shaping or molding operation, to make a Si-g-npPE or silane-grafted ethylenic polymer (Si-g-EP) that has hydrolyzable silane groups.

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627. Vinyl trimethoxy silane (VTMS), vinyl triethoxy silane, vinyl triacetoxy silane, gamma-(meth)acryloxy propyl trimethoxy silane and mixtures of these silanes are the preferred silane crosslinkers for use in this invention.

The amount of silane ("crosslinker") used to functionalize the ethylenic polymer can vary widely depending upon the nature of the polymer, the silane, the processing or reactor conditions, the grafting efficiency, the ultimate application, and similar factors, but typically at least 0.5 wt %, preferably at least 0.7, wt % is used. Considerations of convenience and economy are two of the principal limitations on the maximum amount of silane used, and typically the maximum amount of silane does not exceed 5 wt %, preferably it does not exceed 3, wt %.

The silane is grafted to the ethylenic polymer by any conventional method, typically in the presence of a free radical initiator, e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile. The amount of initiator can vary, but it is typically present in an amount of at least 0.02, preferably at least 0.04, more preferably at least 0.06 wt %. Typically, the initiator does not exceed 1.0, preferably 0.30, most preferably it does not exceed 0.20 wt %. The ratio of silane to initiator also can vary widely, but the typical crosslinker:initiator ratio is between 0.3:1 to 250:1, preferably 5:1 to 50:1, more preferably 10:1 to 30:1, preferably between 13:1 and 24:1.

While any conventional method can be used to graft the silane to the ethylenic polymer, one preferred method is blending the two with the initiator in the first stage of a reactor extruder, such as a twin screw extruder or BUSS™ kneader. Such a process to make Si-g-npPE or silane-grafted ethylenic polymer (Si-g-EP) is referred to as the SIOPLAS™ process, in which a silane monomer is grafted onto the backbone of a base ethylenic polymer by a process such as extrusion, prior to the polymer's incorporation into the present composition, as described, for example, in U.S. Pat. Nos. 4,574,133; 6,048,935; and 6,331,597. The grafting conditions can vary, but the melt temperatures are typically between 160 and 260° C., preferably between 180 and 230° C., depending upon the residence time and the half-life of the initiator.

In an embodiment, the silane-functionalized ethylenic polymer is an in situ Si-g-npPE or Si-g-EP. The in situ Si-g-npPE or Si-g-EP is formed by a process such as the MONOSIL™ process, in which a silane monomer is grafted onto the backbone of a base ethylenic polymer during the extrusion of the present composition to form a coated conductor, as described, for example, in U.S. Pat. No. 4,574,133. In one embodiment, the in situ Si-g-npPE or Si-g-EP is a blend of silane-grafted LLDPE (Si-g-LLDPE) and silane-grafted ethylene plastomer/elastomer.

In one embodiment of the invention in which the composition comprises a silane-grafted ethylenic polymer, the amount of the silane-grafted polymer in the composition is typically from 10 to 99.99 wt %, or to 99.5 wt %, or to 99.3 wt %, or to 99.0 wt %, or to 95 wt %, or to 90 wt %, or to 80 wt %, or to 70 wt %, or to 60 wt %, or to 50 wt %, or to 40 wt %, or to 30 wt %, or to 20 wt %. In one embodiment of the invention in which the composition comprises a silane-grafted ethylenic polymer, the amount of the silane-grafted polymer in the composition is typically from 10, or 20, or 35, or 40, or 50, or 60, or 70, or 80, or 90, or 95, or 99.0, or 99.3, or 99.5 to 99.99 wt %.

In one embodiment of the invention in which the composition comprises an ethylenic polymer and a silane-containing compound, the amount of the ethylenic polymer in the composition is typically from 4.00 to 99.67 wt %, or 99.5 wt %, or 99.3 wt %, or 99.0 wt %, or 95 wt %, or 90 wt %, or 80 wt %, or 70 wt %, or 60 wt %, or 50 wt %, or 400 wt %, or 30 wt %, or 20 wt %. In one embodiment of the invention in which the composition comprises a silane-grafted ethylenic polymer, the amount of the silane-grafted polymer in the composition is typically from 4, or 10, or 20, or 35, or 40, or 50, or 60, or 70, or 80, or 90, or 95, or 99.0, or 99.3, or 99.5 to 99.67 wt %. The amount of silane-containing compound in the composition is typically from 0.3 to 5 wt %, or from 0.5 to 5 wt %, or from 1 to 5 wt %, or from 1 to 4 wt %, or from 1 to 3 wt %, based on the total weight of the composition.

Silanol Condensation Catalyst

In one embodiment the composition of the invention includes a silanol condensation catalyst to promote crosslinking and insure moisture cure. Silanol condensation catalysts known in the art for crosslinking alkoxysilane polymers can be employed for the compositions of the invention. Such catalysts include organic bases, carboxylic acids and organometallic compounds including organic titanates and complexes or carboxylates of lead, cobalt, iron, nickel, zinc and tin, such as dibutyltindilaurate (DBTDL), dioctyltinmaleate, dibutyltindiacetate, dibutyltindioctoate, stannous acetate, stannous octoate, lead naphthenate, zinc caprylate, cobalt naphthenate; and the like. Tin carboxylates, especially dibutyltindilaurate and dioctyltinmaleate, are particularly useful silanol condensation catalysts for the compositions of the invention. The silanol condensation catalyst will be present in an amount from 0.01 to 20 wt %, or from 0.025 to 10 wt %, or from 0.05 to 5 wt %, or from 0.1 to 3 wt %, based on the total weight of the composition. The silanol condensation catalyst may be introduced in the form of a masterbatch. In one embodiment the silanol condensation catalyst is a component of a masterbatch in an amount greater than 0 wt % and preferably less than 40 wt %.

Flame Retardant Additives

Halogenated Flame Retardant

In one embodiment, the composition of this invention comprises at least one halogenated organic flame retardant. Useful halogenated organic compounds have at least one halogen atom, preferably bromine or chlorine, bonded to an aromatic or cycloaliphatic ring which can be monocyclic, bicyclic or multicyclic rings. Bromine is the preferred halogen. The halogenated compound may contain other functional groups which do not adversely affect the processing or physical characteristics of the composition.

Examples of halogenated compounds of the above type include perchloropentacyclodecane; Diels-Alder adducts of hexachlorocyclopentadiene with "enes" such as maleic anhydride; hexabromobenzene; pentabromoethylbenzene 2,4,6-tribromophenol; tribromophenyl allyl ether; octaobromodiphenyl; poly(pentabromobenzyl)acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylenebis(tetrabromophthatmide); hexabromocyclododecane; and the like. Other halogenated compounds useful in the practice of this invention are described in U.S. Pat. No. 6,936,655.

To minimize the amount of the flame retardant compound used, halogenated compounds with high halogen contents are advantageously employed. Particularly desirable are brominated aromatic compounds having bromine contents greater than 65 percent and, more preferably, greater than 75 percent. In a highly useful embodiment, the flame retardant compound is decabromodiphenyl ether or ethane-1,2-bis (pentabromophenyl).

In one embodiment, the halogenated flame retardant will comprise 3 to 60 wt %, or 5 to 55 wt %, or 10 to 50 wt %, or 15 to 45 wt %, of the total composition.

Halogen-Free Flame Retardants

In one embodiment the composition of this invention comprises at least one halogen-free flame retardant (HFFR) that can inhibit, suppress, or delay the production of flames. The HFFRs may be inorganic materials. Examples of the HFFRs suitable for use in compositions according to this disclosure include, but are not limited to, metal hydroxides, red phosphorous, silica, alumina, titanium oxide, carbon nanotubes, talc, clay, organo-modified clay, calcium carbonate, zinc borate, antimony trioxide, wollastonite, mica, ammonium octamolybdate, frits, hollow glass microspheres, intumescent compounds, expanded graphite, and combinations thereof. In an embodiment, the HFFR can be selected from the group consisting of aluminum hydroxide, magnesium hydroxide, calcium carbonate, and combinations thereof.

The HFFR can optionally be surface treated (coated) with a saturated or unsaturated carboxylic acid having 8 to 24 carbon atoms, or 12 to 18 carbon atoms, or a metal salt of the acid. Exemplary surface treatments are described in U.S. Pat. Nos. 4,255,303, 5,034,442 and 7,514,489, US Patent Publication 2008/0251273, and WO 2013/116283. Alternatively, the acid or salt can be merely added to the composition in like amounts rather than using the surface treatment procedure. Other surface treatments known in the art may also be used including silanes, titanates, phosphates and zirconates.

Commercially available examples of HFFRs suitable for use in compositions according to this disclosure include, but are not limited to APYRAL™ 40CD available from Nabaltec AG, MAGNIFIN™ H5 available from Magnifin Magnesiaprodukte GmbH & Co KG, and combinations thereof.

In one embodiment the HFFR will comprise from 2 to 90, or from 5 to 80, or from 10 to 70, wt % of the total composition.

Inorganic flame retardants may be used in combination with halogenated flame retardants. While useful flame retardant formulations are available without such inorganic compounds, flame retardance is increased when they are included and this usually results in the use of lower levels of the halogenated compound. This latter feature is advantageous from an economic standpoint and also from the standpoint of maximizing the physical properties and processability. While an inorganic antimony flame retardant, e.g., antimony trioxide, is typically the inorganic flame retardant of choice, other known and useful (non-limiting) inorganic flame retardants include antimony pentoxide, antimony silicates, boron compounds, carbon black, calcium carbonate, metal hydrates, calcined clay, tin oxide, zinc oxide, zinc borate, zinc molybdate, zinc sulfide, aluminum trioxide and aluminum trihydroxide. The inorganic flame retardant may be coated with a material that will prevent or retard any tendency that the inorganic flame retardant might otherwise have to interfere with the silane cure reaction. Stearic acid is illustrative of such a coating material. Selection of inorganic flame retardant and catalyst is made to avoid any undesired interactions and reactions. The weight ratio of halogenated compound (if present) to inorganic flame retardant typically ranges from 0.5:1 to 5:1 and, more typically, from 0.7:1 to 4:1, and, even more typically, from 1:1 to 3:1.

In one embodiment, the composition of the invention comprises at least one inorganic antimony flame retardant. In one embodiment, the at least one inorganic antimony flame retardant is antimony trioxide, antimony pentoxide, or an antimony silicate. In one embodiment, the inorganic antimony flame retardant is antimony trioxide.

In one embodiment, the composition of the invention comprises at least one inorganic antimony flame retardant in combination with at least one of a zinc compound, including (but not limited to) zinc oxide, zinc borate, zinc molybdate, and zinc sulfide. In one embodiment, the at least one inorganic antimony flame retardant is antimony trioxide, antimony pentoxide, or an antimony silicate. In one embodiment, the inorganic antimony flame retardant is antimony trioxide. In one embodiment, the composition of the invention comprises antimony trioxide in combination with at least one of zinc oxide, zinc borate, zinc molybdate, and zinc sulfide. In one embodiment, the inventive composition comprises an inorganic antimony flame retardant but without any of zinc oxide, zinc borate, zinc molybdate, and zinc sulfide. In one embodiment, the inventive composition comprises an inorganic antimony flame retardant but without any other inorganic flame retardant.

In one embodiment, the total inorganic flame retardant will comprise 3 to 80 wt %, or 5 to 70 wt %, or 10 to 60 wt %, or 15 to 50 wt %, of the composition of the invention. In one embodiment, an antimony flame retardant, preferably antimony trioxide, will comprise 3 to 60 wt %, or 5 to 55 wt %, or 10 to 50 wt %, or 15 to 45 wt %, of the composition of the invention, and at least one of zinc oxide, zinc borate, zinc molybdate, and zinc sulfide will comprise zero to 20 wt %, or greater than zero to 20 wt %, or 1 to 15 wt %, or 2 to 10 wt %, of the composition of the invention.

Moisture-Crosslinkable, Polymeric Composition

In one embodiment, the moisture-crosslinkable, polymeric compositions of this invention comprise (A) nonpolar ethylenic polymer grafted with silane functionality, and (B) a silanol condensation catalyst.

In one embodiment the moisture-crosslinkable, polymeric compositions of this invention comprise (A) a nonpolar ethylenic polymer without grafted silane functionality, (B) a silane-containing compound that can graft to the nonpolar ethylenic polymer, e.g., an unsaturated alkoxy silane, (C) a free-radical initiator, e.g., peroxide, and (D) a silanol condensation catalyst.

In one embodiment the moisture-crosslinkable, polymeric compositions of this invention further comprise a flame retardant additive. In one embodiment the flame retardant additive comprises a halogenated organic flame retardant, while in another embodiment the flame retardant additive comprises both a halogenated flame retardant and an inorganic flame retardant. In one embodiment, the flame retardant additive comprises a halogen-free flame retardant.

In one embodiment, the moisture-crosslinkable, polymeric compositions of this invention comprise one or more additives, e.g., an antioxidant, a UV stabilizer, processing aid, cure booster, etc., in an amount greater than 0 wt % and preferably less than 3 wt %.

It is understood that the sum of the components in each of the foregoing compositions yields 100 weight percent (wt %).

Compounding and Use

Compounding of the moisture-crosslinkable, polymeric composition can be effected by standard means known to those skilled in the art. Examples of compounding equipment are internal batch mixers, such as a BANBURY™ or BOLLING™ internal mixer. Alternatively, continuous single or twin screw mixers can be used, such as a FARREL™ continuous mixer, a WERNER AND PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness, and these are well known to those skilled in the art.

The moisture-crosslinkable, polymeric composition of this invention can be applied to a cable as a sheath or insulation in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die. In a preferred embodiment of this invention in which the ethylene polymer having hydrolysable silane groups has a melt index ($I_2$ of about 0.3 to 7 dg/min), the insulation sheath coated onto the cable will cure within 60 days at room temperature or 24 hours in a 90° C. water bath.

Other articles of manufacture that can be prepared from the moisture-crosslinkable, polymeric composition of this invention, particularly under high pressure and/or elevated moisture conditions, include fibers, ribbons, sheets, tapes, tubes, pipes, weather-stripping, seals, gaskets, foams, footwear and bellows. These articles can be manufactured using known equipment and techniques.

Test specimens prepared from the moisture-curable, polymeric compositions of this invention preferably not only pass the glancing impact test requirements designated by Underwriters Laboratories Ink (UL) for XHHW cable applications (UL 2556 Section 7.14, Edition Number: 4, Edition Date: Dec. 15, 2015), but they also exhibit enhanced retention of ACBD after glancing impact properties relative to compositions alike in all respects save for the vinyl contents and/or molecular weight distributions of the ethylenic polymers used to make nonpolar ethylenic polymer grafted with silane functionality. In one embodiment, a specimen made from one of the compositions of this invention retains an ACBD value, after glancing impact, of ≥2%, or ≥5%, or ≥10%, ≥15%, or ≥20%, or ≥25%, or ≥30%, or ≥35%, or ≥40%, or ≥45%, or ≥50%, or ≥55% as measured by the UL test. The pass criterion in this UL test is ≥20% retention of ACBD.

The following examples further illustrate the invention. Unless otherwise stated, all parts and percentages are by weight. Table 1 shows the properties of the polymers employed in making the compositions.

EXAMPLES

Test Methods

Density is measured according to ASTM D-792.

Crystallinity at room temperature of ethylene homopolymers and ethylene alpha olefin copolymers is calculated using the following equation:

$$Wt\ \%\ Cryst. = \frac{\rho_c}{\rho}\left(\frac{\rho - \rho_a}{\rho_c - \rho_a}\right)$$

where,
$\rho$=Density of ethylenic polymer (grams/cc at 23° C.)
$\rho_a$=Density of amorphous fraction (0.855 g/cc)
$\rho_c$=Density of crystalline fraction (1.00 g/cc)

Crystallinity of any ethylenic polymer is measured as follows: Determine melting peaks and percent (%) or weight percent (wt %) crystallinity of ethylenic polymer using Differential Scanning calorimeter (DSC) instrument DSC Q11000 (TA Instruments).

(A) Baseline calibrate instrument. Use software calibration wizard. First obtain a baseline by heating a cell from −80° to 280° C. without any sample in an aluminum DSC pan. Then use sapphire standards as instructed by the calibration wizard. The analyze 1 to 2 milligrams (mg) of a fresh indium sample by heating the standards sample to 180° C., cooling to 120° C. at a cooling rate of 10° C./minute, then keeping the standards sample isothermally at 120° C. for 1 minute, followed by heating the standards sample from 120° to 180° C. at a heating rate of 10° C./minute. Determine that indium standards sample has heat of fusion=28.71±0.50 Joules per gram (J/g) and onset of melting=156.6°±0.5° C.

(B) Perform DSC measurements on test samples using same DSC instrument. Press test sample of semi-crystalline ethylenic polymer into a thin film at a temperature of 160° C. Weigh 5 to 8 mg of test sample film in DSC pan. Crimp lid on pan to seal pan and ensure closed atmosphere. Place sealed pan in DSC cell, equilibrate cell at 30° C., and heat at a rate of about 100° C./minute to 190° C., keep sample at 190° C. for 3 minutes, cool sample at a rate of 10° C./minute to −60° C. to obtain a cool curve heat of fusion (Hf), and keep isothermally at −60° C. for 3 minutes. Then heat sample again at a rate of 10° C./minute to 190° C. to obtain a second heating curve heat of fusion ($\Delta$Hf). Using the second heating curve, calculate the "total" heat of fusion (J/g) by integrating from −20° C. (in the case of ethylene homopolymers, copolymers of ethylene and hydrolysable silane monomers, and ethylene alpha olefin copolymers of density greater than or equal to 0.90 g/cm³) or −40° C. (in the case of copolymers of ethylene and unsaturated esters, and ethylene alpha olefin copolymers of density less than 0.90 g/cm³) to end of melting. Using the second heating curve, calculate the "room temperature" heat of fusion (J/g) from 23° C. (room temperature) to end of melting by dropping perpendicular at 23° C. Measure and report "total crystallinity" (computed from "total" heat of fusion) as well as "crystallinity at room temperature" (computed from "room temperature" heat of fusion). Crystallinity is measured and reported as percent (%) or weight percent (wt %) crystallinity of the polymer from the test sample's second heating curve heat of fusion ($\Delta$Hf) and its normalization to the heat of fusion of 100% crystalline polyethylene, where % crystallinity or wt % crystallinity=($\Delta$Hf*100%)/292 J/g, wherein $\Delta$Hf is as defined above, * indicates mathematical multiplication, / indicates mathematical division, and 292 J/g is a literature value of heat of fusion ($\Delta$Hf) for a 100% crystalline polyethylene.

Melt index, or $I_2$, is measured in accordance with ASTM D1238, condition 190° C./2.16 kg, and is reported in grams eluted per 10 minutes (g/10 min).

VTMS content of ethylene silane copolymers (Si-g-npPE) is analyzed by infrared spectroscopy after vacuum treatment of the specimens. The method is based on the FTIR absorbances at 1193 cm$^{-1}$ (Si—O—CH3) and 2019 cm$^{-1}$ (internal thickness), using SI-LINK™ DFDA-5451 for calibration. The ratio of the 1193/2019 peak heights is compared to standards with known levels of VTMS. The samples are pressed into 7-10 mils films and vacuumed over night at 50° C. to remove any free (not grafted) VTMS.

Unsaturation content of polyethylene (including terminal vinyls per 1000 carbon atoms) is determined by nuclear magnetic resonance (NMR), Fourier Transform Infrared Spectroscopy (for instance, as per the procedure described in U.S. Pat. No. 8,912,297 B2) or any other known method (or yet to be developed method).

ACBD After Glancing Impact Test Protocol requires securing to one of the broad faces of a hard oak board measuring approximately 50 mm by 100 mm in cross section both ends of each of six 380-millimeter (mm) specimens of finished solid No. 14 AWG Type XHHW wire without damage to the insulation and in a manner that results in the wires being straight and parallel to the longitudinal axis of the board. The board is rigidly supported with the plane formed by the wires inclined 45° from the horizontal and each wire in a vertical plane. A weight of 0.454 kilogram (kg) consisting of a solid right-circular steel cylinder that is 20 mm in diameter, has all surfaces smooth, and has one end rounded to a hemisphere is supported with its longitudinal axis vertical and in a vertical plane containing one of the wires. The hemispherical end is to be down and centered 460 mm above the midpoint of the length of the wire. A straight vertical tube having a 22-mm inside diameter is to surround the cylinder and serve as a guide to keep the cylinder vertical while the cylinder is falling and after it has hit the wire. The inside surface of the guide tube is to be smooth and the tube is of a length that keeps the cylinder from coming out of the guide tube.

While the specimen of wire, the apparatus, and the surrounding air are in thermal equilibrium with one another at a temperature of 24.0±8.0° C., the cylinder is released, fall freely in the guide tube, and strike the wire once, and is then immediately to be raised back up to and secured at the 460-mm height. This process is repeated for each of the five remaining specimens of wire. Each of the impacted specimen has its impacted area immersed in tap water that is at a temperature of 24.0±8.0° C. The water is in a plastic container and is grounded via a suspended metal rod (or in an earth-grounded metal container whose inside metal surface is directly and entirely in contact with the water, but not painted, enameled, or otherwise insulated). The insulation in the impacted area of each specimen is stressed electrically to breakdown by means of a 48-62 Hertz (Hz) potential applied between the conductor in the specimen and the earth-grounded water container. The test potential is supplied by a transformer complying with UL 1581 paragraph 820.1.

The applied potential is increased from near zero to an essentially uniform rate that (i) is not less than 100% of the voltage rating for the product in 60 seconds (s) and (ii) is not more than 100% in 10 s. The rate of increase is not to exceed 500 volts per second (V/s) in any case. The increase continues in this manner until breakdown occurs. The breakdown potential for each of the six impacted specimens is recorded. Each of six 380-mm or longer wire specimens not subjected to the impact is subjected to the dielectric-breakdown procedure with the center portion of its length immersed in water as described above. The breakdown potential is to be recorded for each of these specimens and the average of these potentials is calculated and recorded (excluding the highest and lowest values measured after glancing impact).

The average breakdown potential of finished solid No. 14 AWG Type XHHW wire that have separately been subjected to a glancing impact of 2 Joules (J) or 0.207 meters per kilogram/force (m-kgf) shall not be less than 20 percent of the average breakdown potential of six adjacent specimens of the same wire not subjected to the impact.

Hot creep elongation is measured according to UL 2556 Section 7.9 for conductor sizes of 8 AWG or smaller. Three samples are prepared from the finished wire by removing the insulation from the conductor without damaging the polymer sheath. The total weight to be used in the test will be determined using the following equation:

$$Wt = CA \times 29.0 \text{ lb}_f/\text{in}^2$$

where CA=the cross sectional area of the specimen.

Two marks, 25±2.5 mm apart will be placed on a specimen not under tension. The marks will be at right angles to the direction of pull during testing. One end of the specimen shall be attached to upper grip of the test assembly while the calculated weight will be attached to the other end and the distance between the marks shall be recorded. The entire assembly will be placed in a circulating-air oven preheated to 150±2° C. or 200±2° C. for 15 min. After the 15 min, and with the weight still attached, the distance between the marks shall be measure with a scale to the nearest 1 mm. The hot creep elongation shall be calculated using the following equation:

$$C = \frac{100 \times (D_e - G)}{G}$$

where
C=hot creep elongation, %
$D_e$=distance between the benchmarks obtained
G=original distance between the benchmarks VW-1 Burns is measured by subjecting 3 or 5 cured samples for a specific formulation to the protocol of UL 2556 Section 9.4. This involves 5, 15 second applications of a 125 mm flame impinging on at an angle 20° on a vertically oriented specimen 610 mm (24 in) in length. A strip of kraft paper 12.5±1 mm (0.5±0.1 in) is affixed to the specimen 254±2 mm (10±0.1 in) above the impingement point of the flame. A continuous horizontal layer of cotton is placed on the floor of the test chamber, centered on the vertical axis of the test specimen, with the upper surface of the cotton being 235±6 mm (9.25±0.25 in) below the point at which the tip of the blue inner cone of the flame impinges on the specimen. Test failure is based upon the criteria of either burning the 25% of the kraft paper tape flag, ignition of the cotton batting or if the specimen burns longer than 60 seconds on any of the 5 flame applications. As an additional measure of burn performance, the length of uncharred insulation was measured at the completion of the test.

Tensile strength and elongation at break are measured according to UL 2556 Section 3.5 using a device that indicates the actual maximum load at which the specimen breaks. The device shall operate a power-actuated jaw at speeds of 12 to 305 mm/min and a precision of 20% of the set speed. Three samples are prepared from the finished wire by removing the insulation from the conductor without damaging the polymer sheath. The specimens are straightened and cut to a length sufficient to allow a space of 0.3 m between the jaws of the testing machine when the specimen is in the initial test position. The straight specimen shall be gauge marked at two points 250±2 mm (10±0.08 in) apart. The specimen shall be gripped in the jaws of the machine with the gauge marks between the jaws, and the jaws shall be caused to separate at the rate indicated in Table 2 until the specimen breaks. In order to be accepted as valid, the break shall take place between the gauge marks and shall be no closer than 25 mm (1 in) to either gauge mark. The maximum load before break shall be recorded. The distance between the gauge marks at the time of break shall be recorded to the nearest 2 mm (0.08 in).

Hot deformation measures the resistance to deformation of the wire insulation at elevated temperatures, and it is measured according to UL 2556 Section 7.8. A forced-circulation air oven with an accuracy of ±1° C. is set to 131° C. The wire specimens are nominal 25 mm (1 in) in length and, the diameter of the bare conductor is measured using a dial micrometer in accordance with Clause 3.1, on an adjacent section of the conductor, taken at not more than 150 mm (6 in) from the end of the specimen. The test specimen is marked at the position where the foot of the 500 g weight is to bear on the specimen. The initial thickness of the smoothed specimen is measured using a dial micrometer to an accuracy of 0.001 mm (0.0001 in). The test apparatus and the specimen are conditioned in the air oven at the 131° C. for 1 hour. At the end of this time, while still in the oven, the specimen is placed under the foot of the weight at the marked position. The specimen remains under test under these conditions for 0.5 hours.

At the end of this time, the specimen is carefully removed from under the foot of the weight. Within 15 seconds (s) of removal, the thickness at the marked position is measured. Evidence of splitting, cracking through, and exposed conductor are noted.

The percent of deformation shall be calculated using the following formula:

$$\frac{(T_1 - T_2)}{T_1} \times 100$$

where
$T_1$=thickness before test, mm (in)
$T_2$=thickness after test, mm (in)

Crush resistance is measured according to UL 2556 Section 7.11 using a power driven compression machine capable of measuring the compression force at rupture to an accuracy of 2%. The device shall operate at a power-actuated jaw speed of 10±1 mm/min (0.5±0.05 in/min), employing two flat steel plates 50 mm (2 in.) wide and a 30 Volts DC power with a means of indicating contact between the wire conductor and the steel plate. A 2500 mm (100 in) sample, with one end of the conductor made bare and connected to one side of the power plate, is placed between the horizontally mounted steel plates in the compression machine. The first test point on the specimen is centered on the lower plate and parallel to the 50 mm (2 in) dimension. The upper steel plate is lowered until contact is made with the surface of the specimen. The downward motion of the plate is continued at the specified rate until the indicator signals contact.

The force indicated by the compression machine at the moment of contact is then recorded. The procedure is repeated at nine additional test points at least 250 mm (10 in) apart and at least 125 mm (5 in) from either end of the specimen. The average of the ten measurements is reported and must equal or exceed 1200 psi to be considered a passing result. The crush resistance values reported are the ultimate values, not those from an initial peak (if any exists).

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by T. Williams & I. M. Ward, The Construction of a Polyethylene Calibration Curve for Gel Permeation Chromatography Using Polystyrene Fractions, 6 J. Polymer Sci. Pt. B: Polymer Letter 621, 621-624 (1968)) to derive the following equation:

$$M_{polyethylene} = a \times (M_{polystyrene})^b$$

In this equation, a=0.4316 and b=1.0.

Number average molecular weight, $M_n$, of a polymer is expressed as the first moment of a plot of the number of molecules in each molecular weight range against the molecular weight. In effect, this is the total molecular weight of all molecules divided by the number of molecules and is calculated in the usual matter according to the following formula:

$$M_n = \Sigma n_i \times M_i / \Sigma n_i = \Sigma w_i / \Sigma(w_i/M_i)$$

where
  $n_i$=number of molecules with molecular weight $M_i$
  $w_i$=weight fraction of material having molecular weight $M_i$
  and $\Sigma n_i$=total number of molecules.

Weight average molecular weight, $M_w$, is calculated in the usual manner according to the following formula: $M_w = \Sigma w_i \times M_i$, where $w_i$ and $M_i$ are the weight fraction and molecular weight, respectively, of the $i^{th}$ fraction eluting from the GPC column.

The ratio of these two averages, the polydispersity index (PDI) or molecular weight distribution (MWD or $M_w/M_n$), defines the breadth of the molecular weight distribution.

Inventive Examples 1 to 9A (1E1 to IE9A) and Comparative Examples 1 to 7 (CE1 to CE7)

Table 1 shows the properties of commercially available ethylene silane copolymer (Comparative Example 1), an ethylene ethyl acrylate copolymer used as carrier resin in flame-retardant masterbatch (Comparative Example 2), as well as other ethylenic polymers employed in making "silane-grafted ethylenic polymers" (Comparative Examples 3 to 5 and Inventive Examples 1 to 9A). The "silane grafted ethylenic polymers" (ethylene silane copolymers) are either made by SIOPLAS™ or MONOSIL™ processes.

TABLE 1

Ethylenic Polymers and Their Properties

| | Name | Type OR Function | Melt Index, $I_2$ (dg/min) | Vinyls/ 1000 C | Density (g/cm³) | Crystallinity at Room Temperature Calculated (wt %) | VTMS Content (wt %) | PDI ($M_w/M_n$) |
|---|---|---|---|---|---|---|---|---|
| Comparative Example 1 | SI-LINK ™ AC DFDB-5451 NT | REACTOR ETHYLENE SILANE COPOLYMER | 1.5 | ND | 0.922 | ND | 1.5 | 5.5 |
| Comparative Example 2 | AMPLIFY ™ EA 100 Functional Polymer (Ethylene-Ethyl Acrylate Copolymer) | CARRIER RESIN IN FR MB (NOT SILANE GRAFTED) | 1.3 | ND | 0.930 | ND | 0.0 | 4.7 |
| Comparative Example 3 | DOW ™ Electrical & Telecommunications DFDA-7530 NT (LLDPE) | ETHYLENIC POLYMERS USED TO MAKE SIOPLAS ™ OR MONOSIL ™ ETHYLENE SILANE COPOLYMERS | 0.7 | 0.887 | 0.921 | 49 | 0.0 | 12.7 |
| Comparative Example 4 | DOW ™ DFDA-7059 NT 7 (LLDPE; ethylene/butene copolymer) | | 2.0 | 0.034 | 0.918 | 47 | 0.0 | 4.1 |
| Comparative Example 5 | TUFLIN ™ HS-7001 NT 7 (LLDPE; ethylene/1-hexene copolymer) | | 3.2 | 0.109 | 0.917 | 47 | 0.0 | 4.6 |
| Inventive Example 1 | DOW ™ LLDPE 1648 (LLDPE; ethylene/1-hexene copolymer) | | 3.5 | 0.486 | 0.920 | 49 | 0.0 | 4.1 |
| Inventive Example 2 | DOWLEX ™ 2035G (LLDPE; ethylene/1-octene copolymer) | | 6.0 | 0.266 | 0.919 | 48 | 0.0 | 3.7 |
| Inventive Example 3 | DOWLEX ™ 2047G (LLDPE; ethylene/1-octene copolymer) | | 2.3 | 0.295 | 0.917 | 47 | 0.0 | 3.7 |
| Inventive Example 4 | DOWLEX ™ 2606 GC (LLDPE; ethylene/1-hexene copolymer) | | 4.0 | 0.562 | 0.920 | 49 | 0.0 | 4.0 |
| Inventive Example 5 | DOWLEX ™ 2607G (LLDPE; ethylene/1-hexene copolymer) | | 2.3 | 0.484 | 0.918 | 47 | 0.0 | 4.1 |
| Inventive Example 6 | CEFOR ™ 1221P (LLDPE; ethylene/butene copolymer) | | 2.0 | 0.343 | 0.918 | 47 | 0.0 | 6.4 |
| Inventive Example 7 | CEFOR ™ 1050P (LLDPE; ethylene/butene copolymer) | | 3.0 | 0.404 | 0.916 | 46 | 0.0 | 4.5 |

TABLE 1-continued

Ethylenic Polymers and Their Properties

| Name | Type OR Function | Melt Index, $I_2$ (dg/min) | Vinyls/ 1000 C | Density (g/cm$^3$) | Crystallinity at Room Temperature Calculated (wt %) | VTMS Content (wt %) | PDI ($M_w/M_n$) |
|---|---|---|---|---|---|---|---|
| Inventive Example 8 | PE A (Experimental Polyethylene Resin) | 2.9 | 0.484 | 0.919 | 48 | 0.0 | 3.9 |
| Inventive Example 9 | ELITE ™ 5230G Enhanced Polyethylene Resin (ethylene/1-octene copolymer) | 4.0 | 0.276 | 0.916 | 46 | 0.0 | 3.4 |
| Inventive Example 9A | PE B (Experimental Polyethylene Resin) (ethylene-based elastomer; ethylene/butene copolymer) | 4.5 | ND | 0.890 | 27 | 0.0 | 2.3 |

FR MB = FLAME-RETARDANT MASTERBATCH
ND = Not Determined

Table 2 describes ethylene silane copolymers made by the SIOPLAS™ process from the ethylenic polymers of Comparative Example 5 and Inventive Examples 1 to 2. The functionalization reaction is performed in a 40 millimeter (mm) co-rotating twin screw extruder. The extruder is configured with 11 barrels (44 length to diameter (L/D) ratio). The maximum screw speed is 1200 revolutions per minute (rpm), and the maximum motor output was 150 horsepower (HP). The extruder is equipped with "loss-in-weight feeders," to feed the ethylenic polymers. The vinyltrimethoxysilane (VTMS) and LUPEROX™ 101 peroxide are pre-blended at a 15:1 ratio and metered into the extruder using an Isco syringe pump at Barrel 4 at a loading of 1.85 wt %. The run rate is 125 pounds per hour (lb/h), and the screw speed is varied from 250-475 rpm to adjust the melt index.

A standard temperature profile is used for all experiments, as follows: Barrel 2 at 150° C.; Barrels 3-7, each at 230° C.; Barrels 8-11, each at 190° C. A GALA™ Model 6 underwater pelletizer, equipped with a 6 hole die and divert valve, is used to pelletize the extruded product. The underwater pelletizer die and adaptors are maintained at 190° C. and the water temperature is maintained at 10-15° C. Nitrogen gas is injected, at 10-15 standard cubic feet per hour (SCFH), in the first barrel section to maintain an inert atmosphere and minimize oxidation. A vacuum (20 inches of mercury (Hg)) is pulled on Barrel 10. The resulting "silane grafted ethylenic polymers" (ethylene silane copolymers) of Inventive Examples 10 and 11 desirably exhibited greater VTMS contents than that of Comparative Example 6.

TABLE 2

Properties of SIOPLAS ™ Ethylene Silane Copolymers from Comparative Example 5 and Inventive Examples 1-2

| | SIOPLAS ™ Ethylene Silane Copolymer | Run Rate (lb/hr) | Screw Speed (rpm) | Melt Index, $I_2$ (dg/min) | VTMS Content (%) | Comments |
|---|---|---|---|---|---|---|
| Comparative Example 6 | TUFLIN ™ HS-7001 NT 7-g-VTMS | 125 | 250 | 1.1/1.1 | 1.2 | |
| Inventive Example 10 | Dow ™ LLDPE 1648-g-VTMS | 125 | 600 | 0.9/0.7 | 1.4 | At 350 rpm: $I_2$ = 0.14 dg/min<br>At 475 rpm: $I_2$ = 0.25 dg/min |
| Inventive Example 11 | DOWLEX ™ 2035-g-VTMS | 125 | 350 | 0.6/0.4 | 1.5 | At 250 rpm: $I_2$ = 0.45 dg/min |

Properties of starting ethylenic polymers are given in Table 1

40 mm twin screw extrusion with 1.85 wt % of VTMS/peroxide mixture (15:1 ratio of VTMS:peroxide)

Peroxide used: LUPEROX ™ 101

The ethylenic polymers of Inventive Examples 1 to 2 yielded better silane grafting efficiency than that of Comparative Example 5.

Table 3 shows the measurements of hot creep and retained dielectric (AC breakdown) strength after glancing impact conducted on crosslinked cable insulations made using the MONOSIL™ process for ethylene silane copolymers ("silane grafted ethylenic polymers" or "Si-g-npPE") with the ethylenic polymers of Comparative Examples 3 to 5 and Inventive Examples 1 to 9. Clearly, the relatively higher vinyl contents of the ethylenic polymers of Inventive Examples 1 to 9 have beneficial effects on the ultimate degrees of moisture induced crosslinking (as measured by hot creep—with lower values reflecting greater crosslinking) and glancing impact performance (as measured by retained ACBD—with higher values being indicative of less damage arising from this form of impact).

The experimental procedures used to make the wire specimens of Table 3 are as detailed below:

First Set of Wires: With a view to mimicking the MONOSIL™ process for in situ silane grafting, the liquid additives (VTMS and LUPEROX™ 101 peroxide) are soaked into the resins shown in Table 1. This is done by preheating the resin at 70° C. for one hour in a glass jar followed by addition of VTMS and LUPEROX™ 101 and tumble mixing for 10 minutes. The glass jar with the mixture is left in the oven overnight to complete the soaking. The resulting soaked resin is then physically blended with dried (overnight under vacuum at 60° C.) DFDA-5481 catalyst masterbatch. The physical blend is then melt mixed during extrusion to make wire constructions on 14 AWG solid copper with a nominal 30 mil wall thickness. The unit consists of a BRABENDER ¾" extruder with variable speed drive, a 24:1 "Double-pineapple" mixing head screw, a BRABENDER cross-head wire die, lab water cooling trough with air wipe, a laser micrometer and a variable speed wire puller. The samples are extruded at 40 rpm screw speed and nearly 8 feet per minute take-up speed, using a temperature profile of 150° C./170° C./190° C./195° C. (across zone 1, zone 2, zone 3 and head/die) and a 40/40 mesh screen pack. All wires are subsequently cured in a 90° C. water bath for 4 to 6 hours to ensure full crosslinking prior to physical testing.

Second Set of Wires—Temperature and Mesh Screen Change: With a view to mimicking the MONOSIL™ process for in situ silane grafting, the liquid additives (VTMS and LUPEROX™ 101 peroxide) are soaked into the resins shown in Table 1. This is done by preheating the resin at 70° C. for one hour in a glass jar followed by addition of VTMS and LUPEROX™ 101 and tumble mixing for 10 minutes. The glass jar with the mixture is left in the oven overnight to complete the soaking. The resulting soaked resins is then physically blended with dried (overnight under vacuum at 60° C.) DFDA-5481 catalyst masterbatch. The physical blend is then melt mixed during extrusion to make wire constructions on 14 AWG solid copper with a nominal 30 mil wall thickness. The unit consists of a BRABENDER ¾" extruder with variable speed drive, a 24:1 "Double-pineapple" mixing head screw, a BRABENDER cross-head wire die, lab water cooling trough with air wipe, a laser micrometer and a variable speed wire puller. The samples are extruded at 40 rpm screw speed and 8 feet per minute take-up speed, using a temperature profile of 150° C./160° C./170° C./180° C. (across zone 1, zone 2, zone 3 and head/die) and a 20/40 mesh screen pack. All wires are subsequently cured in a 90° C. water bath for 4 to 6 hours to ensure full crosslinking prior to physical testing.

TABLE 3

Properties of MONOSIL ™ Ethylene Silane Copolymers in Crosslinked Cable Constructions Made from Comparative Example 3-5 and Inventive Examples 1-9

| | MONOSIL ™ Ethylene Silane Copolymers | 1st Set of Wires Made — Hot Creep at 200° C.-After Moisture Crosslinking (%) | 2nd Set of Wires Made | | Comments |
|---|---|---|---|---|---|
| | | | Hot Creep at 200° C.-After Moisture Crosslinking (%) | Retained ACBD after Glancing Impact (%) | |
| Comparative Example 7 | DOW ™ DFDA-7530 NT-g-VTMS | 6.5 | 6.1 | 14.2 | Melt index of DFDA-7530 is too low (below 1.5 dg/min) |
| Comparative Example 8 | DOW ™ DFDA-7059 NT-g-VTMS | 33.5 | 21.1 | 49.7 | Vinyls content of DFDA-7059 is too low (below 0.2) |
| Comparative Example 9 | TUFLIN ™ HS-7001 NT 7-g-VTMS | 43.6 | 23.6 | 71.6 | Vinyls content of HS-7001 is too low (below 0.2) |
| Inventive Example 12 | DOW ™ LLDPE 1648-g-VTMS | 26.0 | 6.5 | 84.2 | Desirably less hot creep and better "retained ACBD" than that obtained with HS-7001 of similar melt index as LLDPE 1648 (due to higher vinyls content) |
| Inventive Example 13 | DOWLEX ™ 2035G-g-VTMS | 61.9 | 28.2 | 55.4 | Hot creep is higher (and "retained ACBD" is lower) than that of Inventive Example 12 due to relatively high melt index of DOWLEX ™ 2035G |
| Inventive Example 14 | DOWLEX ™ 2047G-g-VTMS | 15.9 | Not Tested | Not Tested | Desirably less hot creep than that obtained with DFDA-7059 of similar melt index as DOWLEX ™ 2047G (due to higher vinyls content) |
| Inventive Example 15 | DOWLEX ™ 2606 GC-g-VTMS | 22.2 | Not Tested | Not Tested | Desirably less hot creep than that obtained with HS-7001 in spite of higher melt index of DOWLEX ™ 2606 GC (due to higher vinyls content) |
| Inventive Example 16 | DOWLEX ™ 2607G-g-VTMS | 10.9 | Not Tested | Not Tested | Desirably less hot creep than that obtained with DFDA-7059 of similar |

TABLE 3-continued

Properties of MONOSIL ™ Ethylene Silane Copolymers in Crosslinked Cable Constructions
Made from Comparative Example 3-5 and Inventive Examples 1-9

| | MONOSIL ™ Ethylene Silane Copolymers | 1st Set of Wires Made Hot Creep at 200° C.-After Moisture Crosslinking (%) | 2nd Set of Wires Made Hot Creep at 200° C.-After Moisture Crosslinking (%) | Retained ACBD after Glancing Impact (%) | Comments |
|---|---|---|---|---|---|
| Inventive Example 17 | CEFOR ™ 1221P-g-VTMS | 15.9 | Not Tested | Not Tested | melt index as DOWLEX ™ 2607G (due to higher vinyls content) Desirably less hot creep than that obtained with DFDA-7059 of identical melt index as CEFOR ™ 1221P (due to higher vinyls content) |
| Inventive Example 18 | CEFOR ™ 1050P-g-VTMS | 16.9 | Not Tested | Not Tested | Desirably less hot creep than that obtained with HS-7001 of similar melt index as CEFOR ™ 1050P (due to higher vinyls content) |
| Inventive Example 19 | PE A-g-VTMS | 18.1 | Not Tested | Not Tested | Desirably less hot creep than that obtained with HS-7001 of similar melt index as PE A (due to higher vinyls content) |
| Inventive Example 20 | ELITE ™ 5230G-g-VTMS | 38.7 | Not Tested | Not Tested | Desirably less hot creep than that obtained with HS-7001 in spite of higher melt index of ELITE ™ 5230G (due to higher vinyls content) |

Properties of starting ethylenic polymers are given in Table 1
1.6 wt % of VTMS/peroxide mixture (15:1 ratio of VTMS:peroxide) soaked overnight into polymer pellets
Peroxide used: LUPEROX ™ 101
Crosslinked wire insulation composition and constructions made with VTMS soaked into ethylenic polymers, grafting achieved during wire extrusion, and moisture cured subsequently in water bath Table 4 reports the properties of moisture crosslinked and flame-retarded wire insulation constructions made with some of the ethylene silane copolymers of Tables 1 and 2. Improvements in values of hot deformation resistance, retained dielectric (AC breakdown) strength after glancing impact and crush resistance are demonstrated through the use of the Si-g-npPE of Inventive Examples 10 and 11 (instead of the ethylene silane copolymer of Comparative Example 1).

The experimental procedure used to make the wire specimens of Table 4 is as follows: The components listed in Table 4 are melt-mixed during wire extrusion to make wire constructions (14 AWG solid copper wire, 30 mil nominal wall thickness) that are subsequently crosslinked by curing in a hot water bath set at 90° C. for at least 8 hours. The wires are fabricated using a 2.5-inch Davis Standard extruder with a double-flighted Maddock screw and 20/40/60/20 mesh screens, at the following set temperatures (° C.) across zone 1/zone 2/zone 3/zone 4/zone 5/head/die: 190.6/198.9/210.0/221.1/229.4/229.4/229.4. The length-to-diameter (L/D) ratio of the screw is 26 (measured from the beginning of the screw flight to the screw tip) or 24 (measured from the screw location corresponding to the end of the feed casing to the screw tip). The wire construction of Inventive Example 21 is fabricated using screw speed of 39 rpm and line speed of 300 feet per minute. The wire construction of Inventive Example 22 is fabricated using screw speed of 50 rpm and line speed of 300 feet per minute. Inventive Example 21 and Inventive Example 22 of the present invention both exhibited excellent ACBD after glancing impact, greater than that observed with Comparative Example 10 (fabricated using screw speed of 42 rpm and line speed of 300 feet per minute).

TABLE 4

Crosslinked and Flame-Retardant Wire Insulation Compositions and Constructions (33 mil Wall Thickness) Made with the SIOPLAS ™ Process-Made Ethylene Silane Copolymers of Tables 1 and 2

| COMPONENTS | Comparative Example 10 LOADING (wt %) | Inventive Example 21 LOADING (wt %) | Inventive Example 22 LOADING (wt %) |
|---|---|---|---|
| Ethylene Silane Copolymers | | | |
| SI-LINK ™ AC DFDB-5451 NT (Comparative Example 1) | 38.5 | — | — |
| Dow ™ LLDPE 1648-g-VTMS (Inventive Example 10) | — | 38.5 | — |
| DOWLEX ™ 2035-g-VTMS (Inventive Example 11) | — | — | 38.5 |
| Black Color Masterbatch | — | — | — |
| SI-LINK ™ DFDB-5410 BK PE Components Introduced Through | 3.4 | 3.4 | 3.4 |

TABLE 4-continued

Crosslinked and Flame-Retardant Wire Insulation Compositions and Constructions (33 mil Wall Thickness) Made with the SIOPLAS ™ Process-Made Ethylene Silane Copolymers of Tables 1 and 2

| COMPONENTS | Comparative Example 10 LOADING (wt %) | Inventive Example 21 LOADING (wt %) | Inventive Example 22 LOADING (wt %) |
|---|---|---|---|
| Flame-Retardant and Catalyst Masterbatch | | | |
| AMPLIFY ™ EA 100 (Comparative Example 2) | 0.096 | 0.096 | 0.096 |
| LLDPE 1648 (Inventive Example 1) | 14.58 | 14.58 | 14.58 |
| SAYTEX 8010 (Halogenated Flame Retardant) | 21.46 | 21.46 | 21.46 |
| BRIGHTSUN HB500 (Antimony Trioxide) | 16.51 | 16.51 | 16.51 |
| ZOCO 104 (Zinc Oxide) | 4.96 | 4.96 | 4.96 |
| BNT-CAT 425 (DBTDL) (Silanol Condensation Catalyst) | 0.13 | 0.13 | 0.13 |
| CHIMASSORB ™ 119 (Hindered Amine Light Stabilizer) | 0.003 | 0.003 | 0.003 |
| IRGANOX ™ 1024 FG (Antioxidant) | 0.08 | 0.08 | 0.08 |
| IRGANOX ™ 1010 (Antioxidant) | 0.17 | 0.17 | 0.17 |
| Total wt % | 100.0 | 100.00 | 100.00 |
| PROPERTIES AFTER MOISTURE CURE | | | |
| Hot Creep (150° C.) | 68 | 33 | 32 |
| Hot Deformation (%) | 40.9 | 30.0 | 23.8 |
| Tensile Strength (psi) | Not Determined | 2241 | 1745 |
| Tensile Elongation (%) | Not Determined | 192 | 268 |
| Retained ACBD after Glancing Impact (%) | 52 | 90 | 92 |
| Crush Resistance (psi) | 1787 | >1800 | >1800 |
| VW-1 | Pass | Pass | Pass |

Crosslinked wire insulation constructions were moisture cured in water bath

The carrier resin in SI-LINK ™ DFDB-5410 BK PE is DOW ™ DNDA-8320 NT 7 Linear Low Densit Polyethylene Resin (20.0 dg/min melt index, $I_2$, dg/min; 0.924 g/cc density; 52 wt % crystallinity at room temperature-calculated)

Table 5 shows the properties of moisture crosslinked and flame-retarded wire or cable insulation constructions made using the MONOSIL™ process for ethylene silane copolymers Si-g-npPE) with the ethylenic polymers of Comparative Examples 3 to 4 and Inventive Examples 1 to 2. After moisture induced crosslinking, the cables of Inventive Examples 23 and 24 exhibit superior values of crush resistance and retained dielectric (AC breakdown) strength after glancing impact than the cables of Comparative Examples 11 and 12.

The experimental procedure used to make the wire or cable specimens of Table 5 is as follows: The compositions are reported in Table 5. With a view to mimicking the MONOSIL™ process for in situ silane grafting, the liquid additives (VTMS and LUPEROX™ 101 peroxide) are soaked into the physical blends of resins and the components introduced through flame-retardant masterbatch as shown in Table 5. This is done by tumble mixing resins (DOW™ DFDA-7530 NT or DOW™ DFDA-7059 NT 7 Linear Low Density Polyethylene (LLDPE) Resin or DOW™ LLDPE 1648 Linear Low Density Polyethylene Resin or DOWLEX™ 2035G Linear Low Density Polyethylene Resin) with flame retardant masterbatches in a fiber drum and then adding VTMS and LUPEROX™ 101 at room temperature and doing additional tumble blending for 5 minutes. The drum is then left for soaking of the liquid additives into the physical blends at room temperature for at least 12 hours. Lid of the drum is then opened under a local elephant trunk vent or local exhaust ventilation. Next, the physical blends containing resins (DOW™ DFDA-7530 NT or DOW™ DFDA-7059 NT 7 Linear Low Density Polyethylene Resin or DOW™ LLDPE 1648 Linear Low Density Polyethylene Resin or DOWLEX™ 2035G Linear Low Density Polyethylene Resin), flame retardant masterbatches (and soaked with VTMS and peroxide) are tumble-mixed with SI LINK™ DFDA-5481, and the resulting physical blend is melt-mixed during wire extrusion to make wire constructions (14 AWG solid copper wire, 30 mil nominal wall thickness) that are subsequently crosslinked by curing in a hot water bath set at 90° C. for at least 8 hours. The wires are fabricated using a 2.5-inch Davis Standard extruder with a double-flighted Maddock screw and 20/40/60/20 mesh screens, at the following set temperatures (° C.) across zone 1/zone 2/zone 3/zone 4/zone 5/head/die: 176.7/182.2/187.8/193.3/193.3/182.2/182.2. The length-to-diameter (L/D) ratio of the screw is 26 (measured from the beginning of the screw flight to the screw tip) or 24 (measured from the screw location corresponding to the end of the feed casing to the screw tip). The wire constructions of Comparative Example 11 and Comparative Example 12 are fabricated using screw speed of 11.75 rpm and 12.0 rpm, respectively and line speed of 75 feet per minute. The wire constructions of Inventive Example 23 and Inventive Example 24 are fabricated using screw speed of 20.5 rpm and 21.5-22.25 rpm, respectively and line speed of 150 feet per minute.

TABLE 5

Crosslinked and Flame-Retardant Wire Insulation Compositions and Constructions
(30 mil Wall Thickness) Made with MONOSIL ™ Process using Ethylenic Polymers of
Comparative Examples 3 to 4 and Inventive Examples 1 and 2

| COMPONENTS | Comparative Example 11 LOADING (wt %) | Comparative Example 12 LOADING (wt %) | Inventive Example 23 LOADING (wt %) | Inventive Example 24 LOADING (wt %) |
|---|---|---|---|---|
| SI-LINK ™ DFDA-5481 Natural (Catalyst Masterbatch)* | 4.0 | 4.0 | 4.0 | 4.0 |
| DOW ™ Electrical & Telecommunications DFDA-7530 NT (Comparative Example 3) | 44.4 | — | — | — |
| DOW ™ DFDA-7059 NT 7 LLDPE (Comparative Example 4) | — | 44.4 | — | — |
| DOW ™ LLDPE 1648 LLDPE (Inventive Example 1) | — | — | 44.4 | — |
| DOWLEX ™ 2035G LLDPE (Inventive Example 2) | — | — | — | 44.4 |
| VTMS (Soaked into Physical Blend of Flame-Retardant Masterbatch and One of the Above Polymers and Grafted During Wire Extrusion) | 1.5 | 1.5 | 1.5 | 1.5 |
| Luperox ™ 101 peroxide (Soaked into Physical Blend of Flame-Retardant Masterbatch and One of the Above Polymers) | 0.1 | 0.1 | 0.1 | 0.1 |
| Components Introduced Through Flame-Retardant Masterbatch | | | | |
| AMPLIFY ™ EA 100 (Comparative Example 2) | 9.97 | 9.78 | 9.78 | 9.78 |
| SAYTEX 8010 (Halogenated Flame Retardant) | 22.5 | 22.5 | 22.5 | 22.5 |
| BRIGHTSUN ™ HB500 (Antimony Trioxide) | 17.5 | 17.5 | 17.5 | 17.5 |
| Chimassorb ™ 119 (Hindered Amine Light Stabilizer) | 0.006 | 0.006 | 0.006 | 0.006 |
| IRGANOX ™ 1010 (Antioxidant) | 0.03 | 0.03 | 0.03 | 0.03 |
| Total wt % | 100.00 | 100.00 | 100.00 | 100.00 |
| PROPERTIES AFTER MOISTURE CURE | | | | |
| Retained ACBD after Glancing Impact (%) | 25 | 55 | 80 | 93 |
| Crush Resistance (psi) | 1396 | 1547 | 1773 | 1791 |

Properties of starting ethylenic polymers are given in Table 1
Crosslinked wire insulation compositions and constructions made with VTMS soaked into ethylenic polymers and flame-retardant masterbatch, grafting achieved during wire extrusion, and moisture cured subsequently in water bath
*SI-LINK ™ DFDA-5481 Natural is a catalyst masterbatch containing a blend of 1-butene/ethylene polymer, ethylene homopolymer, phenolic compound antioxidant, DBTDL (a silanol condensation catalyst), and a phenolic hydrazide compound.

Table 6 shows the time-dependent measurements of insulation hot creep after cure of wire or cable specimens at 23° C. and 70% relative humidity (RH) or in a waterbath at 90° C. The wire or cable insulation constructions are made using the MONOSIL™ process with either an ethylene elastomer (PE B of Inventive Example 9A) or blends of the ethylene elastomer with the LLDPE of Inventive Examples 4 and 5. Examples with ethylene elastomer alone (i.e., not blended with LLDPE) were expected to cure faster than the blends because of the ethylene elastomer's lower crystallinity (and corresponding faster moisture diffusion). However, blending the higher crystallinity LLDPE with the ethylene elastomer surprisingly accelerates the composition's crosslinking.

TABLE 6

Crosslinked and Flame-Retardant Wire Insulation Compositions and Constructions
(40 mil Wall Thickness) Made with MONOSIL ™ Process using Ethylenic
Polymers of Inventive Examples 4, 5, and 9A

| COMPONENTS | Comparative Example 13 LOADING (wt %) | Inventive Example 25 LOADING (wt %) | Inventive Example 26 LOADING (wt %) | Inventive Example 27 LOADING (wt %) | Inventive Example 28 LOADING (wt %) |
|---|---|---|---|---|---|
| SI-LINK ™ DFDA-5481 Natural (Catalyst Masterbatch)* | 5.0 | 5.0 | 5.0 | 5.0 | 5.0 |
| PE B (Inventive Example 9A) | 93.65 | 65.56 | 65.56 | 56.19 | 56.19 |
| DOWLEX ™ 2606 GC (Inventive Example 4) | 28.10 | — | — | 37.46 | — |
| DOWLEX ™ 2607G (Inventive Example 5) | — | — | 28.10 | — | 37.46 |
| VTMS (Soaked into PE B and Grafted During Wire Extrusion) | 1.27 | 1.27 | 1.27 | 1.27 | 1.27 |
| Luperox ™ 101 peroxide (Soaked into PE B) | 0.1 | 0.1 | 0.1 | 0.1 | 0.1 |
| Total wt % | 100.00 | 100.00 | 100.00 | 100.00 | 100.00 |
| Ratio of PE B to LLDPE | 1:0 | 70:30 | 70:30 | 60:40 | 60:40 |

TABLE 6-continued

Crosslinked and Flame-Retardant Wire Insulation Compositions and Constructions
(40 mil Wall Thickness) Made with MONOSIL ™ Process using Ethylenic
Polymers of Inventive Examples 4, 5, and 9A

| COMPONENTS | | Comparative Example 13 LOADING (wt %) | Inventive Example 25 LOADING (wt %) | Inventive Example 26 LOADING (wt %) | Inventive Example 27 LOADING (wt %) | Inventive Example 28 LOADING (wt %) |
|---|---|---|---|---|---|---|
| PROPERTIES AFTER MOISTURE CURE | | | | | | |
| Hot Creep (200° C., 0.2 MPa) | 1 Day at 23° C./70% RH | 117 | 55 | 38 | 54 | 32 |
| | 2 Days at 23° C./70% RH | 70 | 40 | 26 | 34 | 22 |
| | 3 Days at 23° C./70% RH | 59 | 36 | 25 | 30 | 21 |
| | 7 Days at 23° C./70% RH | 45 | 30 | 21 | 24 | 17 |
| | 3 Hours in 90° C. waterbath | 24 | 20 | 15 | 15 | 16 |

Properties of starting ethylenic polymers and ethylene-based elastomer are given in Table 1.
Crosslinked wire insulation compositions and constructions made with VTMS soaked into the PE B ethylene- based elastomer, grafting achieved during wire extrusion, and moisture cured subsequently in water bath.
*SI-LINK ™ DFDA-5481 Natural is a catalyst masterbatch containing a blend of 1-butene/ethylene polymer, ethylene homopolymer, phenolic compound antioxidant, DBTDL (a silanol condensation catalyst), and a phenolic hydrazide compound.

The experimental procedure used to make the wire or cable specimens of Table 6 is as follows: With a view to mimicking the MONOSIL™ process for in situ silane grafting, the liquid additives (VTMS and LUPEROX™ 101 peroxide) are soaked into the ethylene elastomer (PE B of Inventive Example 9A). This is done by preheating the resin at 70° C. for two hours in a glass jar followed by addition of VTMS and LUPEROX™ 101 and tumble mixing for 10 minutes. The glass jar with the mixture is placed back in the oven overnight to complete the soaking, but the oven is turned off. The resulting soaked resin is then physically blended at room temperature with dried (overnight under vacuum at 60° C.) DFDA-5481 catalyst masterbatch and optionally the LLDPE of Inventive Examples 4 and 5. The physical blend is then melt mixed during extrusion to make wire constructions on 14 AWG solid copper with a nominal 40 mil wall thickness. The unit consists of a BRABENDER ¾" extruder with variable speed drive, a 24:1 "Double-pineapple" mixing head screw, a BRABENDER cross-head wire die, lab water cooling trough with air wipe, a laser micrometer and a variable speed wire puller. The samples are extruded at 40 rpm screw speed and nearly 8 feet per minute take-up speed, using a temperature profile of 150° C./170° C./190° C./195° C. (across zone 1, zone 2, zone 3 and head/die) and a 20/40 mesh screen pack. All wires are subsequently cured in a 90° C. water bath for 3 hours to ensure full crosslinking, or in a humidity chamber at 23° C. and 70% relative humidity to monitor crosslinking over time.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A moisture-crosslinkable, polymeric composition comprising in weight percent (wt %) based on the weight of the composition:
   (A) 10 to 99.99 wt % of a nonpolar ethylenic polymer grafted with silane functionality (Si-g-npPE), the npPE having the following properties before grafting:
   (1) a vinyl content of 0.2 to 0.7 per 1,000 carbon atoms,
   (2) a melt index (MI or $I_2$) of 1.5 to 7.0 decigrams per minute (dg/min),
   (3) a density of 0.913 to 0.965 grams per cubic centimeter (g/cc), and
   (4) a molecular weight distribution (MWD or Mw/Mn) of equal to or less than (≤)8;
   (B) 0.01 to 20 wt % of a silanol condensation catalyst; and
   (C) 0 to 70 wt % of a flame retardant additive.

2. The composition of claim 1 in which nonpolar ethylenic polymer is made in an uncatalyzed process.

3. The composition of claim 2 in which the nonpolar ethylenic polymer component of the Si-g-npPE is at least one of a high density polyethylene (HDPE); medium density polyethylene (MDPE); linear low density polyethylene (LLDPE); low density polyethylene (LDPE); very low density polyethylene (VLDPE); a homogeneously branched, linear ethylene/α-olefin copolymer; and a homogeneously branched, substantially linear ethylene/α-olefin polymer.

4. The composition of claim 3 further comprising a silane-grafted ethylene plastomer/elastomer.

5. The composition of claim 1 in which the silane-containing component of the Si-g-npPE is derived from a compound of the formula:

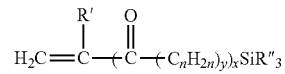

in which R' is a hydrogen atom or methyl group; x and y are 0 or 1 with the proviso that when x is 1, y is 1; n is an integer from 1 to 12 inclusive, and each R" independently is a hydrolyzable organic group having from 1 to 12 carbon atoms with the proviso that not more than one of the three R" groups is an alkyl.

6. A moisture-crosslinkable, polymeric composition comprising in weight percent based on the weight of the composition:
   (A) 4.00 to 99.67 wt % of a nonpolar ethylenic polymer (npPE) having:
   (1) a vinyl content of 0.2 to 0.7 per 1,000 carbon atoms,
   (2) an $I_2$ of 1.5 to 7.0 dg/min,
   (3) a density of 0.913 to 0.965 g/cc, and
   (4) MWD of equal to or less than (≤)8;
   (B) 0.3 to 5 wt % of an alkoxysilane;
   (C) 0.01 to 20 wt % of a silanol condensation catalyst;
   (D) 0.02 to 1.0 wt % peroxide initiator; and
   (E) 0 to 70 wt % of a flame retardant additive.

7. The composition of claim 6 in which nonpolar ethylenic polymer is made in an uncatalyzed process.

8. The composition of claim 6 in which the npPE is at least one of a high density polyethylene (HDPE); medium density polyethylene (MDPE); linear low density polyethylene (LLDPE); low density polyethylene (LDPE); very low density polyethylene (VLDPE); a homogeneously branched, linear ethylene/α-olefin copolymer; and a homogeneously branched, substantially linear ethylene/α-olefin polymer.

9. The composition of claim 8 further comprising an ethylene plastomer/elastomer.

10. The composition of claim 9 in which the silane-containing compound is of the formula:

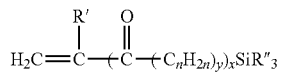

in which R' is a hydrogen atom or methyl group; x and y are 0 or 1 with the proviso that when x is 1, y is 1; n is an integer from 1 to 12 inclusive, and each R" independently is a hydrolyzable organic group having from 1 to 12 carbon atoms with the proviso that not more than one of the three R" groups is an alkyl.

11. The composition of claim 10 in which the flame retardant additive is a halogenated flame retardant is at least one of perchloropentacyclodecane; a Diels-Alder adduct of hexachlorocyclopentadiene with maleic anhydride; hexabromobenzene; pentabromoethylbenzene 2,4,6-tribromophenol; tribromophenyl allyl ether; ethylene-1,2-bis(pentabromophenyl); octaobromodiphenyl; poly(pentabromobenzyl)acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylene-bis(tetrabromophthatmide); and hexabromocyclododecane.

12. The composition of claim 11 further comprising an inorganic antimony flame retardant.

13. The composition of 10 in which the flame retardant additive is halogen-free.

14. The composition of claim 6 in which the silanol condensation catalyst is at least one of an organic titanate and complexes or carboxylates of lead, cobalt, iron, nickel, zinc and tin.

15. An article made from a composition of claim 6 in which the article has an ACBD value of ≥20% after a glancing impact as measured by the UL 2556 Section 7.14, Edition Number: 4, Edition Date: Dec. 15, 2015 glancing impact test.

16. The article of claim 15 as a wire or cable coating.

* * * * *